United States Patent
Rozman et al.

(10) Patent No.: US 8,928,293 B1
(45) Date of Patent: Jan. 6, 2015

(54) SYSTEMS FOR WOUND FIELD SYNCHRONOUS MACHINES WITH ZERO SPEED ROTOR POSITION DETECTION DURING START FOR MOTORING AND IMPROVED TRANSIENT RESPONSE FOR GENERATION

(71) Applicant: Hamilton Sundstrand Corporation, Charlotte, NC (US)

(72) Inventors: Gregory I. Rozman, Rockford, IL (US); Jacek F. Gieras, Glastonbury, CT (US); Steven J. Moss, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 13/958,169

(22) Filed: Aug. 2, 2013

(51) Int. Cl.
| H02P 9/10 | (2006.01) |
| H02P 9/14 | (2006.01) |
| H02P 9/08 | (2006.01) |
| H02P 3/00 | (2006.01) |
| H02P 9/06 | (2006.01) |

(52) U.S. Cl.
CPC ... H02P 9/14 (2013.01); H02P 9/08 (2013.01)
USPC .................. 322/79; 322/10; 322/29; 290/31; 290/44; 290/46

(58) Field of Classification Search
USPC .................. 322/10, 29, 79; 290/31, 44, 46
See application file for complete search history.

(56) References Cited

U.S. PATENT DOCUMENTS

| | | | | |
|---|---|---|---|---|
| 3,908,161 A | * | 9/1975 | Messenger ..................... 322/29 |
| 4,032,835 A | * | 6/1977 | Finnell et al. .................. 322/86 |
| 4,093,869 A | * | 6/1978 | Hoffmann et al. ............... 290/31 |
| 4,152,636 A | * | 5/1979 | Gorden ........................... 322/25 |
| 4,336,486 A | * | 6/1982 | Gorden et al. .................. 322/63 |
| 4,625,160 A | * | 11/1986 | Hucker ........................... 322/32 |
| 4,743,777 A | * | 5/1988 | Shilling et al. ................. 290/46 |
| 4,772,802 A | * | 9/1988 | Glennon et al. ................. 290/31 |
| 4,806,841 A | * | 2/1989 | Lee et al. ........................ 322/29 |
| 4,868,406 A | * | 9/1989 | Glennon et al. ................. 290/4 R |
| 4,939,441 A | * | 7/1990 | Dhyanchand ................... 318/718 |
| 4,947,100 A | * | 8/1990 | Dhyanchand et al. .......... 322/10 |
| 4,967,334 A | * | 10/1990 | Cook et al. ...................... 363/34 |
| 4,968,926 A | * | 11/1990 | Dhyanchand ................... 322/10 |
| 4,992,721 A | * | 2/1991 | Latos ............................... 322/10 |
| 5,008,801 A | * | 4/1991 | Glennon ......................... 363/132 |
| 5,012,177 A | * | 4/1991 | Dhyanchand et al. .......... 322/10 |
| 5,013,929 A | * | 5/1991 | Dhyanchand ................... 290/31 |
| 5,015,941 A | * | 5/1991 | Dhyanchand ................... 322/10 |
| 5,055,700 A | * | 10/1991 | Dhyanchand ................... 290/31 |
| 5,068,590 A | * | 11/1991 | Glennon et al. ................. 322/10 |

(Continued)

*Primary Examiner* — Pedro J Cuevas
(74) *Attorney, Agent, or Firm* — Edwards Wildman Palmer LLP; Scott D. Wofsy; Joshua L. Jones

(57) ABSTRACT

An electrical machine includes a stator having a main armature winding, an exciter field winding, and a transformer primary winding. A rotor is operatively connected to rotate relative to the stator, wherein the rotor includes an exciter armature winding operatively connected to the exciter armature winding for field excitation therebetween, a main field winding operatively connected to the main armature winding for field excitation therebetween, and a transformer secondary winding operatively connected to the transformer primary winding to form a rotating transformer. A generator control unit is operatively connected to the main armature winding, exciter field winding, and transformer primary winding to control the main armature and exciter field windings based on excitation in the primary winding received from the transformer secondary winding.

20 Claims, 7 Drawing Sheets

(56) References Cited

U.S. PATENT DOCUMENTS

| | | | |
|---|---|---|---|
| 5,097,195 A * | 3/1992 | Raad et al. | 322/10 |
| 5,111,376 A * | 5/1992 | Mehl | 363/71 |
| 5,309,081 A * | 5/1994 | Shah et al. | 322/10 |
| 5,334,923 A * | 8/1994 | Lorenz et al. | 318/805 |
| 5,340,362 A | 8/1994 | Carbone | 623/23.19 |
| 5,363,032 A * | 11/1994 | Hanson et al. | 322/10 |
| 5,430,362 A * | 7/1995 | Carr et al. | 318/779 |
| 5,488,286 A | 1/1996 | Rozman et al. | 322/10 |
| 5,493,200 A * | 2/1996 | Rozman et al. | 322/10 |
| 5,594,322 A * | 1/1997 | Rozman et al. | 322/10 |
| 5,920,162 A * | 7/1999 | Hanson et al. | 318/400.04 |
| 5,949,664 A * | 9/1999 | Bernet et al. | 363/37 |
| 6,462,429 B1 * | 10/2002 | Dhyanchand et al. | 290/31 |
| 6,486,640 B2 * | 11/2002 | Adams | 322/59 |
| 6,906,479 B2 * | 6/2005 | Xu et al. | 318/140 |
| 6,909,262 B2 * | 6/2005 | Yao et al. | 322/28 |
| 6,909,263 B2 * | 6/2005 | Xu et al. | 322/10 |
| 6,933,704 B2 * | 8/2005 | Nelson et al. | 322/29 |
| 6,960,840 B2 * | 11/2005 | Willis et al. | 290/52 |
| 6,998,726 B2 * | 2/2006 | Sarlioglu et al. | 290/31 |
| 7,072,790 B2 | 7/2006 | Hu et al. | 702/147 |
| 7,122,994 B2 * | 10/2006 | Anghel et al. | 322/60 |
| 7,215,100 B2 * | 5/2007 | Velhner et al. | 322/59 |
| 7,327,113 B2 * | 2/2008 | Steigerwald et al. | 318/599 |
| 7,400,056 B2 * | 7/2008 | McGinley et al. | 290/46 |
| 7,456,510 B2 * | 11/2008 | Ito et al. | 290/44 |
| RE40,713 E * | 5/2009 | Geis et al. | 318/140 |
| 7,577,545 B2 * | 8/2009 | Hu | 702/151 |
| 7,880,448 B2 * | 2/2011 | Patterson | 322/46 |
| 7,915,869 B2 * | 3/2011 | Xu et al. | 322/59 |
| 8,013,459 B2 * | 9/2011 | Ito et al. | 290/44 |
| 8,035,357 B2 * | 10/2011 | Patterson | 322/46 |
| 8,097,968 B2 * | 1/2012 | Anghel et al. | 290/31 |
| 8,138,694 B2 * | 3/2012 | Steigerwald et al. | 318/139 |
| 8,299,762 B2 * | 10/2012 | Rozman et al. | 322/37 |
| 8,358,111 B2 * | 1/2013 | Rozman et al. | 322/46 |
| 8,362,728 B2 * | 1/2013 | Patel et al. | 318/400.33 |
| 8,378,641 B2 * | 2/2013 | Rozman et al. | 322/24 |
| 8,427,116 B2 * | 4/2013 | Rozman et al. | 322/37 |
| 8,519,656 B2 * | 8/2013 | Tamai et al. | 318/400.33 |
| 8,581,425 B2 * | 11/2013 | Rozman et al. | 290/1 A |
| 8,593,095 B2 * | 11/2013 | Markunas et al. | 318/400.33 |
| 8,773,080 B2 * | 7/2014 | Albsmeier | 322/24 |
| 2005/0046398 A1 * | 3/2005 | Anghel et al. | 322/60 |
| 2006/0208710 A1 * | 9/2006 | Velhner et al. | 322/58 |
| 2008/0079262 A1 * | 4/2008 | McGinley et al. | 290/31 |

* cited by examiner

SYSTEMS FOR WOUND FIELD SYNCHRONOUS MACHINES WITH ZERO SPEED ROTOR POSITION DETECTION DURING START FOR MOTORING AND IMPROVED TRANSIENT RESPONSE FOR GENERATION

BACKGROUND OF THE INVENTION

1. Field of the Invention

The present invention relates to electrical machines such as motors and generators, and more particularly to angular position and velocity estimation of wound field synchronous machines (WFSM).

2. Description of Related Art

Electrical machines can be used as motors or as generators. In aeronautical applications, for example, it is desirable to use a single machine for a starter motor and a generator to reduce size and weight. An aircraft generator can be used as a motor to start the propulsion engine for the aircraft when it is powered by an inverter.

To reduce cost and improve reliability, it is very desirable for the engine starter to eliminate mechanical shaft sensors. In general, there are two categories in sensorless motor control, the back EMF based method and the signal injection method. The back EMF based method is easy to implement, and usually works quite well at high angular rotor velocity, but it is inadequate for low velocity or standstill. The signal injection method is more difficult to implement, but can be advantageous for operation at low angular rotor velocity or standstill. Most systems that utilize the signal injection method are also subject to a 180 degree rotor position anomaly because these systems are not able to recognize if they are locking onto the positive or negative pole of the rotor.

Such conventional methods and systems have generally been considered satisfactory for their intended purpose. However, there is still a need in the art for systems and methods that allow for improved performance such as reliability, complexity, and cost. There also remains a need in the art for such systems and methods that are easy to make and use. The present disclosure provides a solution for these problems.

SUMMARY OF THE INVENTION

An electrical machine includes a stator including a main armature winding, an exciter field winding, and a transformer primary winding. A rotor is operatively connected to rotate relative to the stator, wherein the rotor includes an exciter armature winding operatively connected to the exciter field winding for field excitation therebetween, a main field winding operatively connected to the main armature winding for field excitation therebetween, and a transformer secondary winding operatively connected to the transformer primary winding to form a rotating transformer. A generator control unit is operatively connected to the main armature winding, exciter field winding, and transformer primary winding to control the main armature and exciter field windings based on excitation in the transformer primary winding received from the transformer secondary winding.

The generator control unit can be configured to direct external power through the stator to drive the rotor in a motoring mode and to deliver power from the stator to an external load in a generate mode. An AC power source can be operatively connected between the generator control unit and the transformer primary winding to control power to the rotating transformer. A damper can be connected in parallel with the transformer primary winding.

In certain embodiments, the generator control unit includes an electric engine start controller having a position and velocity decoder configured and adapted to receive inverter voltage signals and to output position and velocity feedback. A proportional and integral regulator is included with a first switch for switching between a velocity reference input for the motoring mode and a DC voltage reference for a generate mode, and a second switch for switching between the velocity feedback and a DC voltage feedback input. The proportional and integral regulator is configured to output a quadrature current reference signal in the motoring mode and a direct current reference signal in the generate mode. A field oriented control is operatively connected to receive the reference signals from the proportional and integral regulator, the position feedback from the position and velocity decoder, and inverter current signals and to output stationary reference frame command signals.

It is contemplated that a quadrature generator can be operatively connected to an AC power source to inject a signal, e.g., a sine signal, into the rotating transformer. The position and velocity decoder can include a Clark's Transformation component operatively connected to convert three phase inverter voltage signals into two phase voltage signals. A pair of synchronous filters can each be operatively connected to receive a respective one of the two phase voltage signals. Each synchronous filter can also be operatively connected to receive sine and cosine signals from a quadrature generator and to output first and second filtered two phase voltage signals phase-shifted by 90 electrical degrees that contain rotor position information.

In certain embodiments a second Clark's Transformation component is operatively connected to convert three phase inverter current signals into two phase current signals and an extended rotor flux estimator is operatively connected to receive the two phase current signals and the two phase voltage signals and to output first and second extended flux voltage signals phase-shifted by 90 electrical degrees that contain extended rotor flux information. A position/velocity estimator can be included with a first switch for switching between a first extended flux voltage input in a high speed mode and a first filtered two phase voltage signal input in a low speed mode and a second switch for switching between a second extended flux voltage signal input in a high speed mode and a second filtered two phase voltage signal in a low speed mode. The position/velocity estimator is configured to output the position feedback and the velocity feedback. An estimated mode selector can be operatively connected to receive the velocity feedback and control the first and second switches of the position/velocity estimator for selection between the high and low speed modes.

A method of controlling an electrical machine includes receiving an excitation signal with a primary transformer winding of an electrical machine such as described above. The method also includes estimating position and velocity of the rotor based on the excitation signal and using estimated position and velocity of the rotor to control the electrical machine. Using estimated position and velocity of the rotor to control the electrical machine can include controlling rotor toque in a motoring mode and controlling output voltage in a generate mode.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
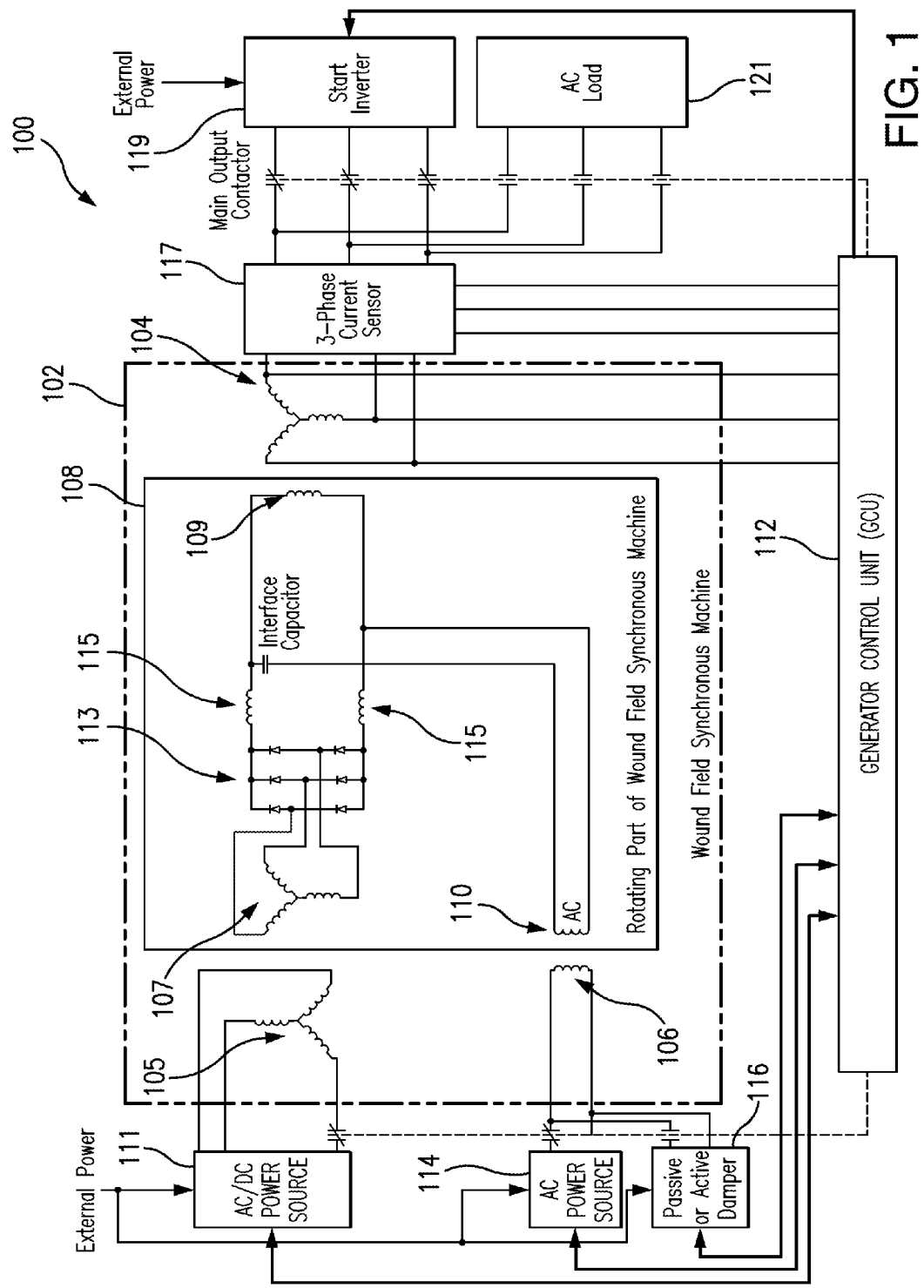
FIG. 1 is a schematic view of an exemplary embodiment of an electrical machine system architecture, showing the high frequency rotating transformer.

Reference will now be made to the drawings wherein like reference numerals identify similar structural features or aspects of the subject disclosure. For purposes of explanation and illustration, and not limitation, a partial view of an exemplary embodiment of an electrical machine is shown in FIG. 1 and is designated generally by reference character 100. Other embodiments of electrical machines, or aspects thereof, are provided in FIGS. 2-8, as will be described. The systems and methods of the disclosure can be used, for example, to completely eliminate the resolver as a position sensor for electric engine start and active rectification commutation to improve system reliability, complexity, and cost without necessarily reducing power density.

FIG. 1 is an electrical machine architecture diagram for an electric start, electric power generation system (ES/EPGS). Electrical machine 100 includes a stator 102 including a main armature winding 104, an exciter field winding 105, and a transformer primary winding 106, e.g., an excitation coil. A rotor 108 is operatively connected to rotate relative to stator 102. Rotor 108 includes an exciter armature winding 107 operatively connected to exciter field winding 105 for field excitation therebetween, a main field winding 109 operatively connected to main armature winding 104 for field excitation therebetween, and a transformer secondary winding 110 operatively connected to transformer primary winding 106 to form a rotating transformer.

A generator control unit 112 is operatively connected to main armature winding 104, exciter field winding 105, and transformer primary winding 106 to control the main armature and exciter field windings 104 and 105 based on excitation in transformer primary winding 106 received from transformer secondary winding 110. Generator control unit 112 is connected to direct external power through stator 102 to drive rotor 108 in a motoring mode and to deliver power from stator 102 to an external load in a generate mode.

An AC power source 114 is operatively connected between generator control unit 112 and transformer primary winding 106 to control power to the rotating transformer. The transformer can be a high frequency rotating transformer (HFRT) designed to operate, for example from 1.0-40 kHz, or any other suitable frequency range subject to transformer size and EMI filter design considerations. A damper 116 is connected in parallel with transformer primary winding 106. AC power source 114 controls the excitation frequency in transformer secondary winding 110.

As also indicated in FIG. 1, external power can be routed through an AC/DC power source 111 to power exciter field winding 105 and through an AC power source and passive or active damper 116 to power transformer primary winding 106. Passive or active damper 116 is employed to reduce torsional oscillations of electrical machine 100 created by a distributed mechanical spring-mass system with torsional resonance. A rotating rectifier 113 connects between exciter armature winding 107 and main field winding 109. Additionally, two parallel interface inductors 115 connect between rotating rectifier 113 and main field winding 109. Transformer secondary winding 110 is connected in parallel with main filed winding 109 between the interface inductors 115 and main field winding 109, and one of the connections of transformer secondary winding 110 includes a capacitor for blocking DC current from transformer secondary winding 110. The interface inductors 115 are used to decouple the high frequency transformer secondary winding 110 from the rotating rectifier 113. The high frequency current from the transformer secondary winding 110 is injected into the main field winding to be used in identification of rotor position as discussed below.

Figure 2:
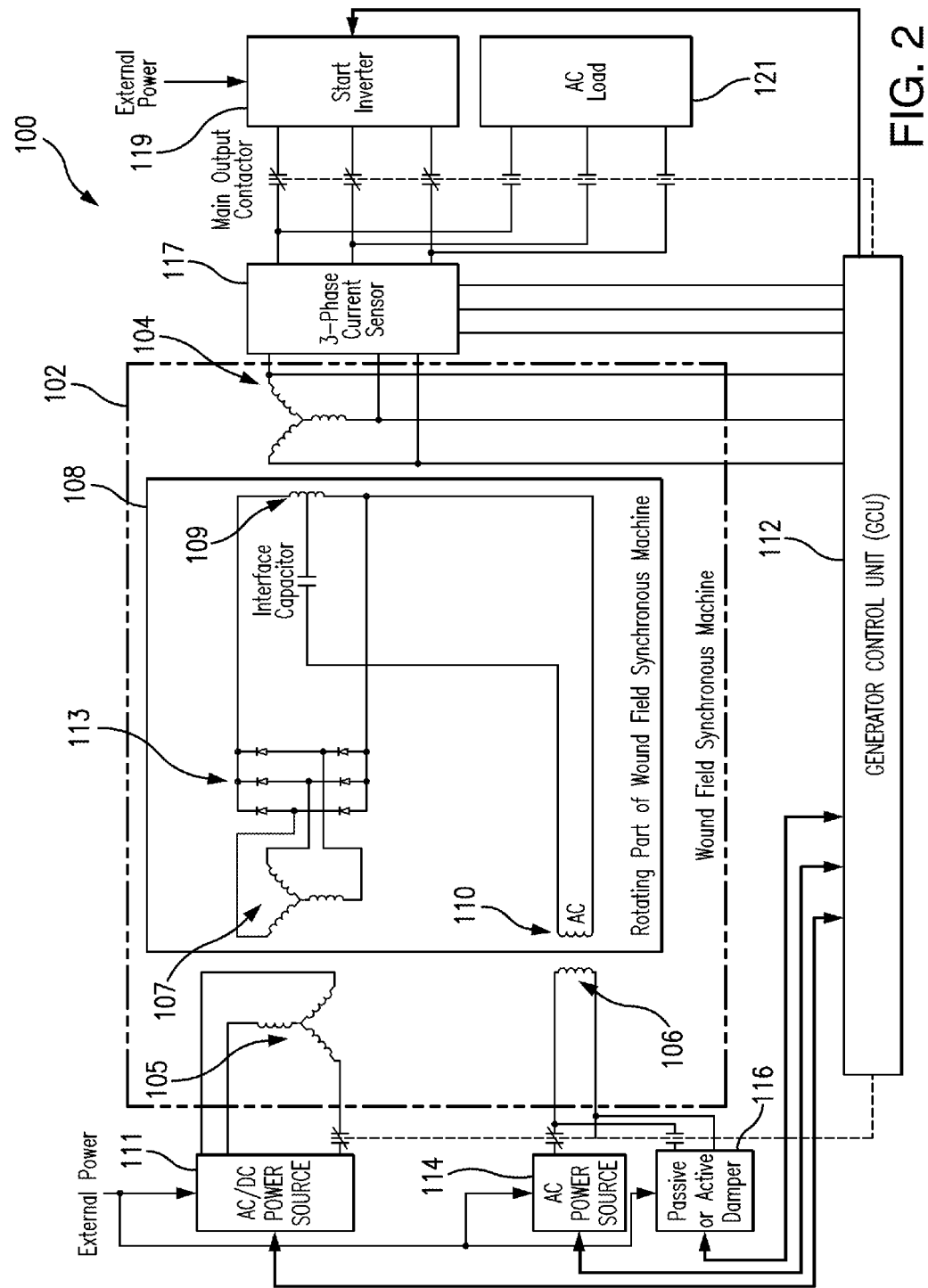
FIG. 2 is a schematic view of another exemplary embodiment of an electrical machine system architecture, showing a high frequency rotating transformer with a connection to the main field winding that differs from that shown in FIG. 1.

Referring to FIG. 2, another possible connection between the transformer secondary winding 110 and main field winding 109 is shown. In FIG. 2, there are no interface inductors, and transformer secondary winding 110 connects through an interface capacitor to a point in the midst of the windings of main field winding 109 to be in parallel with only a portion of main field winding 109. Injecting high frequency current in the center-tap of the main field winding in this manner allows elimination of the interphase inductors. The other portions of electrical machine 100 shown in FIG. 2 are the same as shown in FIG. 1.

Referring again to FIG. 1, main armature winding 104 connects directly to generator control unit 112, and also connects to a three-phase current sensor 117, which in turn also connects with generator control unit 112. A start inverter 119 is connected to three-phase current sensor 117 in parallel with an AC load 121. In the motoring mode, external power can be routed through start inverter 119, which is controlled by generator control unit 112 to power main armature winding 117. In the generate mode, power from main armature winding 104 can be delivered to AC load 121 by way of three-phase current sensor 117. Other aspects of traditional electrical machines employed in electrical machine 100 can be found, for example, in U.S. Pat. No. 5,340,362 and U.S. Pat. No. 5,488,286, each of which is incorporated by reference herein in its entirety.

Figure 3:
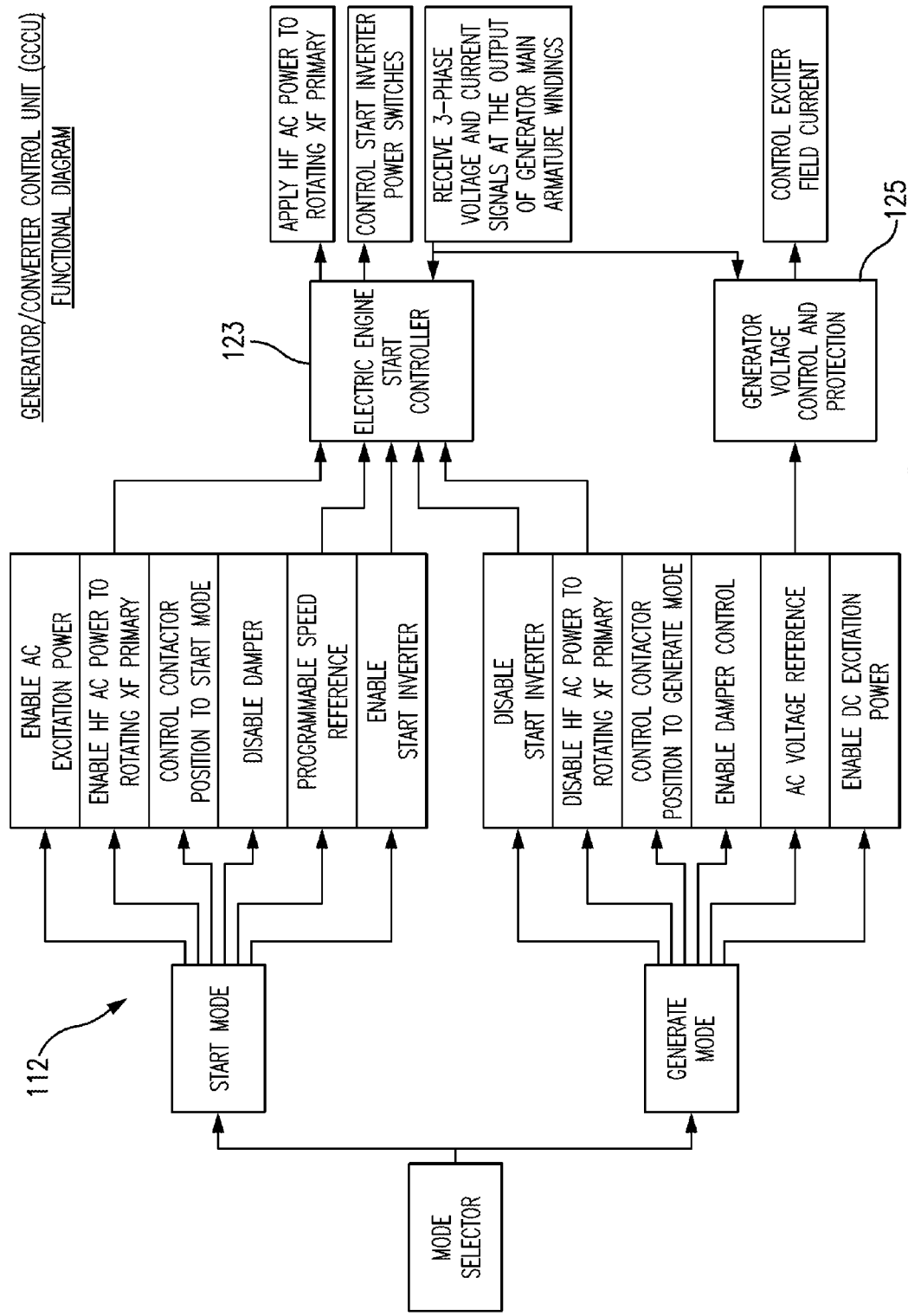
FIG. 3 is a block diagram of an exemplary embodiment of a generator control unit (GCU) for use with the system architectures of FIGS. 1 and 2, showing the electric engine start controller.

Referring now to FIG. 3, generator control unit 112 includes an electric engine start controller 123 and a generator voltage control and protection unit 125. In the start mode, as selected by the mode selector, AC excitation power is enabled, high frequency AC power to the rotating transformer is enabled in electric engine start controller 123, the contactor (shown in FIGS. 1 and 2) position is controlled to be in the start mode, damper 116 is disabled, and the start inverter is enabled by way of electric engine start controller 123. During start mode the speed reference, e.g., programmable speed reference, allows optimization of the engine start by controlling acceleration rate of the engine, for example in starting a gas turbine engine using electrical machine 100. Similarly in the generate mode, the start inverter is disabled by way of electric engine start controller 123, as is the high frequency AC power to the rotating transformer. The contactor position is controlled to be in the generate mode, and damper 116 is enabled. The AC voltage reference is provided to generator voltage control and protection unit 125, and DC excitation power is enabled. Electric engine start controller 123 outputs a signal to apply the high frequency AC power to the rotating transformer via transformer primary winding 106, and outputs a signal to control the start inverter power switches. Electric engine start controller 123 and generator voltage control and protection unit 125 both receive three-phase voltage and current signals at the output of main armature winding 104 in the generate mode. Voltage control and protection unit 125 outputs a control signal to control field current in exciter field winding 105.

Figure 4:
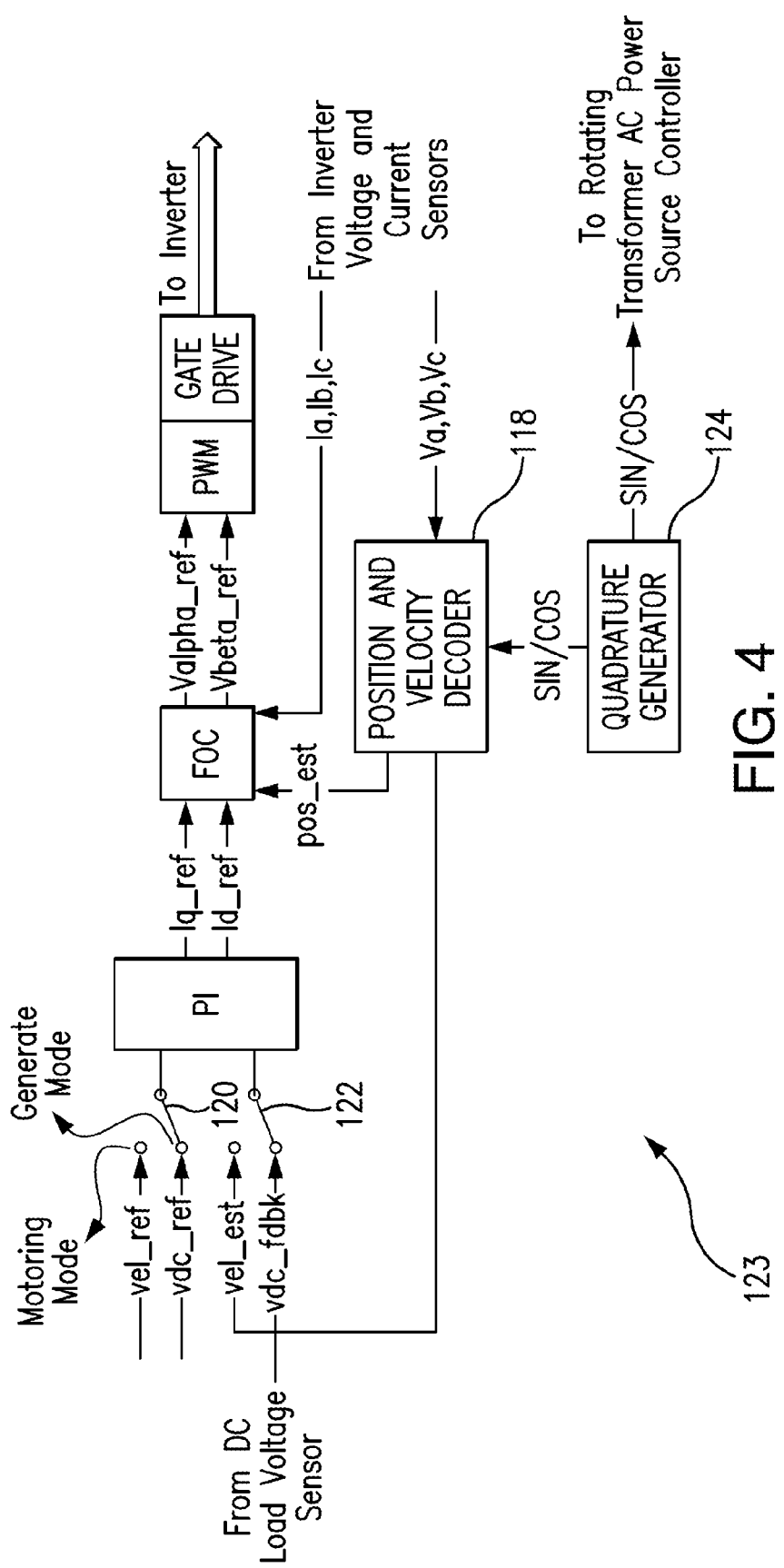
FIG. 4 is a block diagram of an exemplary embodiment of the electric engine start controller of FIG. 3, showing the inputs and outputs for use in determining rotor position and velocity for the motoring and generate modes, and also showing the position and velocity decoder.

Referring now to FIG. 4, electric engine start controller 123 includes a position and velocity decoder 118 connected to receive inverter voltage signals $V_a$, $V_b$, and $V_c$ and to output position and velocity feedback, designated pos_est and vel_est in FIG. 4, respectively. A proportional and integral regulator, designated PI in FIG. 4, is included with a first switch 120 for switching between a velocity reference input for the motoring mode and a DC voltage reference for a generate mode. The PI also has a second switch 122 for switching between the velocity feedback and a DC voltage feedback input. The PI is configured to output a quadrature current reference signal, designated Iq_ref in FIG. 4, and a direct current reference signal, Id_ref in FIG. 4, in both the motoring and generate modes. A field oriented control (FOC) is operatively connected to receive the reference signals from the PI, the position feedback from position and velocity decoder 118, and inverter current signals $I_a$, $I_b$, and $I_c$ and to output stationary reference frame command signals Valpha_ref and Vbeta_ref. Quadrature generator 124 is connected to an AC power source to inject a signal, e.g., a sine signal, into the rotating transformer. The PWM converter shown in FIG. 4 operates as an engine start inverter during motoring mode and can be used as an active rectifier during the generate mode.

Electrical machine 100 with the AC signal injected in the excitation coil, i.e. transformer secondary winding 110, operates as a synchro at the injected frequency. The 3-wire synchro output can be easily converted into the resolver-equivalent format using Clark's 3-phase to 2-phase transformation (ABC to αβ stationary reference frames). The AC signal that contains rotor position information can be selected using synchronous filters which are synchronized with the quadrature generator that is used to inject ac signal into field winding. FIG. 4 is a high level block diagram of an electric engine start controller, which includes a speed control function using a field-oriented controller (FOC) to control motor torque in response to the estimated rotor position.

Figure 5:
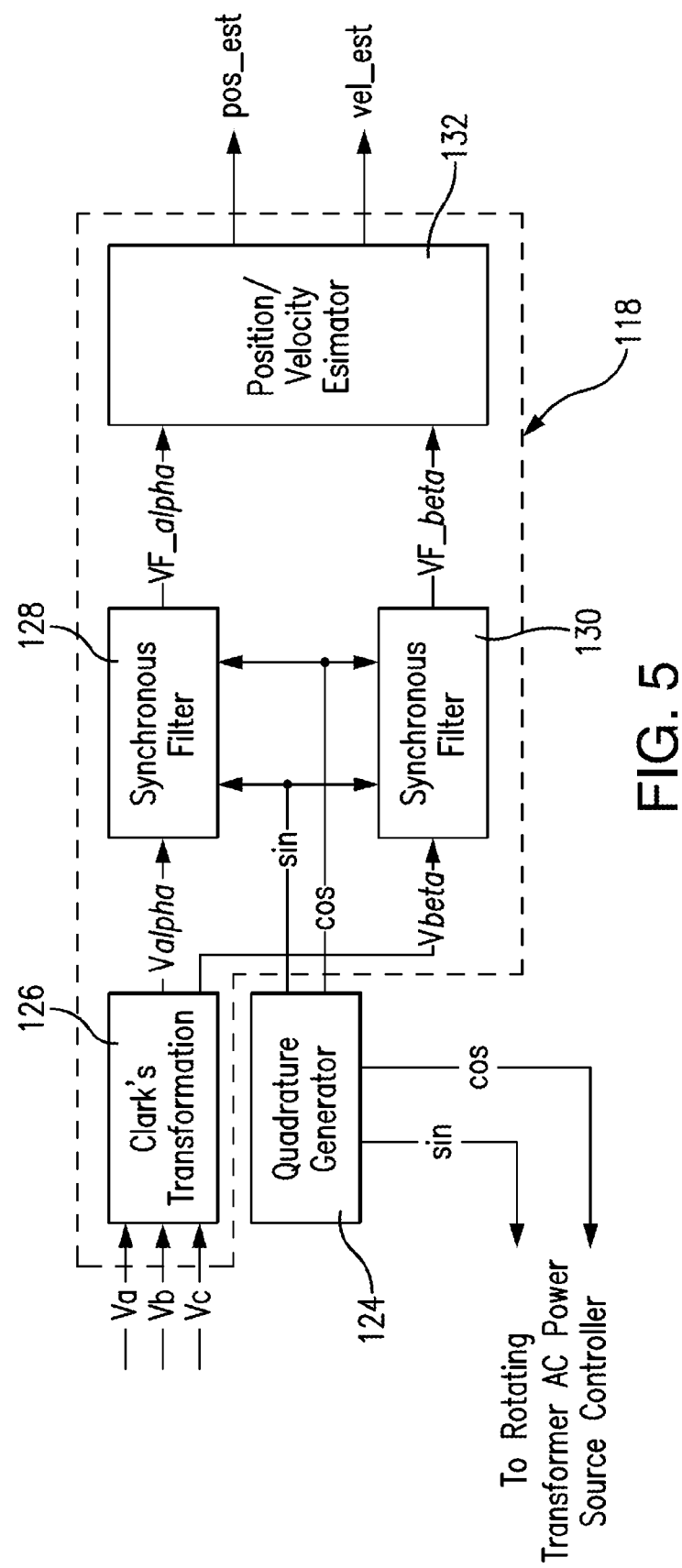
FIG. 5 is a block diagram of an exemplary embodiment of the position and velocity decoder of FIG. 4, showing the synchronous filters and the position/velocity estimator.

Referring now to FIG. 5, position and velocity decoder 118 includes a Clark's Transformation component 126 operatively connected to convert the three phase inverter voltage signals $V_a$, $V_b$, and $V_c$ into two phase voltage signals Valpha and Vbeta. A pair of synchronous filters 128 and 130 are connected each to receive a respective one of the two phase voltage signals Valpha and Vbeta. Each of the synchronous filters 128 and 130 is also connected to receive sine and cosine signals from quadrature generator 124 and to output respective first and second filtered two phase voltage signals, VF_alpha and VF_beta, phase-shifted by 90 electrical degrees that contain rotor position information to position/velocity estimator 132. Position/velocity estimator 132 in turn outputs the position and velocity feedback, labeled pos_est and vel_est in FIG. 5, which are also shown in FIG. 4.

FIG. 5 illustrates an embodiment using resolver-based signal processing to estimate rotor position from zero to high generator speed. Another embodiment that utilizes a zero/low speed position estimator and high speed position estimator based extended rotor flux is shown in FIG. 6.

Figure 6:
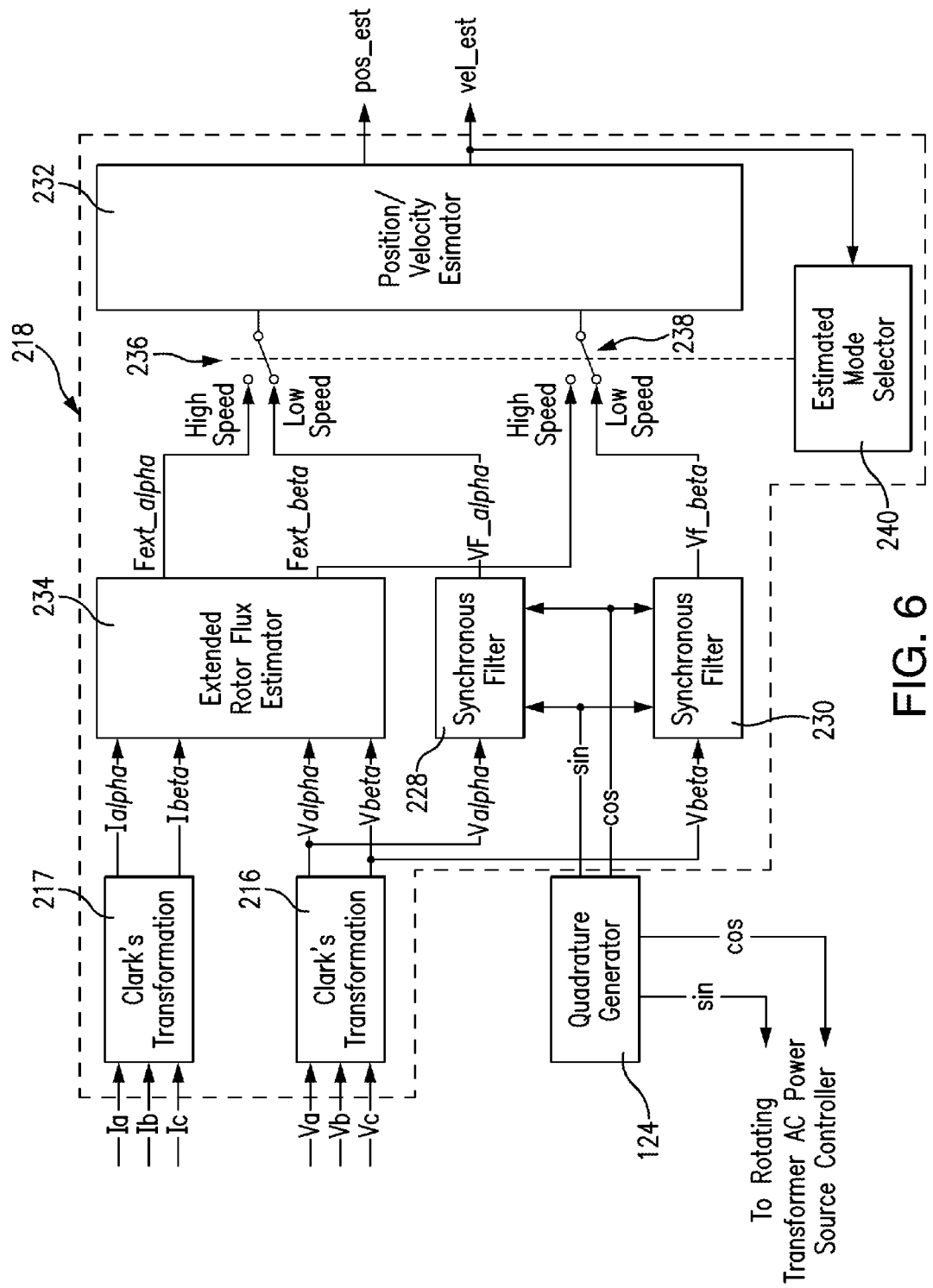
FIG. 6 is a block diagram of another exemplary embodiment of a position and velocity decoder of FIG. 4, showing an extended rotor flux estimator.

Making reference now to FIG. 6, a second embodiment of a position and velocity decoder 218 is shown, which can be used in generator control unit 112 of FIG. 4 in lieu of position and velocity decoder 118. Position and velocity decoder 218 includes a Clark's Transformation component 216 and synchronous filters 228 and 230 connected as described above with respect to FIG. 5. In addition, position and velocity decoder 218 includes a second Clark's Transformation component 217 connected to convert the three phase/inverter current signals $I_a$, $I_b$, and $I_c$, into two phase current signals Ialpha and Ibeta. An extended rotor flux estimator 234 is connected to receive the two phase current signals Ialpha and Ibeta and the two phase voltage signals Valpha and Vbeta and to output first and second extended flux voltage signals Fext_alpha and Fext_beta phase-shifted by 90 electrical degrees that contain extended rotor flux information.

A position/velocity estimator 232 is included with a first switch 236 for switching between Fext_alpha input in a high speed mode and VF_alpha input in a low speed mode and a second switch 238 for switching between Fext_beta input in a high speed mode and VF_beta in a low speed mode. Position/velocity estimator 232 is configured to output the position feedback and the velocity feedback as described above. An estimated mode selector 240 is connected to receive the velocity feedback, labeled vel_est in FIG. 6, and control the switches 236 and 238 of position/velocity estimator 232 for selection between the high and low speed modes. In the low speed mode, position and velocity decoder 218 operates the same as position and velocity decoder 118 of FIG. 5. In the high speed mode, position and velocity decoder 218 can switch to operate based on extended rotor flux.

Figure 7:
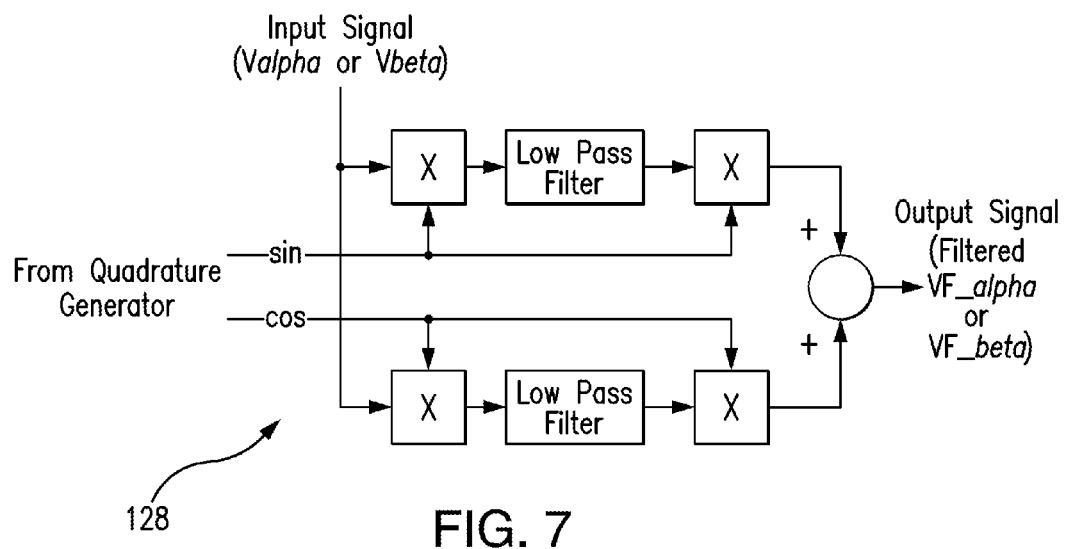
FIG. 7 is a block diagram of an exemplary embodiment of one of the synchronous filters shown in FIGS. 5 and 6.
Figure 8:
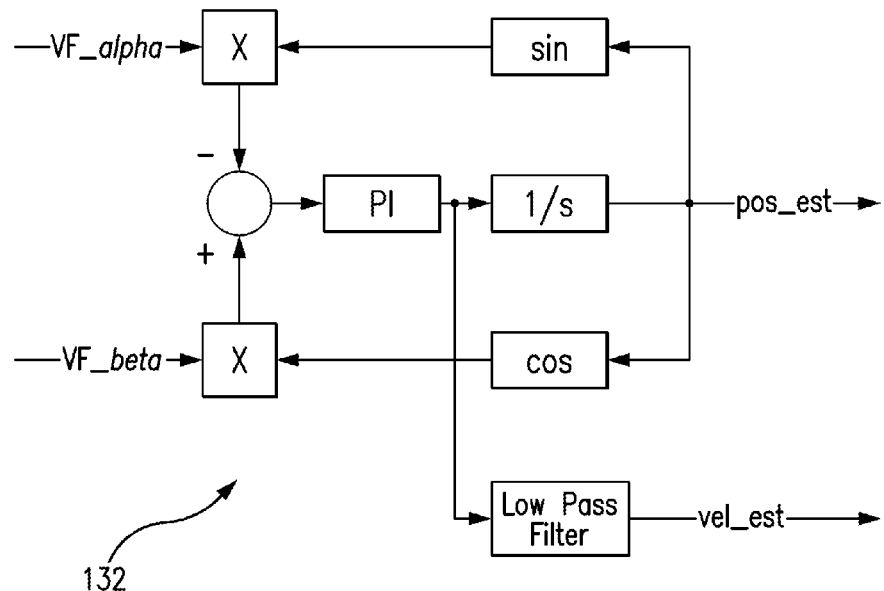
FIG. 8 is a block diagram of an exemplary embodiment of a position and velocity estimator shown in FIG. 5.

Details of a synchronous filter implementation and resolver-based signal processing for position and velocity estimation are shown in FIGS. 7 and 8. Additional details can be found in U.S. Pat. No. 7,072,790 which is incorporated by reference above. Referring to FIG. 7, a block diagram of a synchronous filter 128 is shown. Synchronous filters 128, 130, 228, and 230 can all be of the same configuration as that shown in FIG. 7. Synchronous filters select voltage components Valpha and Vbeta that contain rotor position information and are synchronized with the signals from the quadrature generator. With reference to FIG. 8, a block diagram of the position/velocity estimator 132 of FIG. 5 is shown. The same phase-locked loop configuration can be used for the position velocity/estimator 232 of FIG. 6, the difference being that position velocity/estimator 232 connects to its inputs through switches 236 and 238.

An exemplary method of controlling an electrical machine, e.g., electrical machine 100, includes receiving an excitation signal with a primary transformer winding of the electrical machine. The position and velocity of the rotor can be estimated by separating the excitation coil signal and the signal of the exciter field and armature windings and using estimated position and velocity of the rotor to control the electrical machine using a generator control unit, e.g., generator control unit 112 described above in. Using estimated position and velocity of the rotor to control the electrical machine can include controlling rotor toque in a motoring mode and controlling output voltage in a generate mode.

The Electric Start/Electric Power Generating System (ES/EPGS) architecture illustrated in FIG. 1 includes a modified Wound Field Synchronous Machine (WFSM) that includes a single phase high frequency rotating transformer (HFRT). The HFRT is connected via interface capacitor to the rotating DC bus that feeds the main field winding. The purpose of the HFRT is to inject a small AC signal into the main field winding. The interface capacitor prevents the HFRT secondary winding from being connected directly to the DC bus to avoid magnetic saturation of the core. The interface inductors reduce circulating current through the rotating rectifier diodes at injected high frequency. Another embodiment is shown in FIG. 2 with an AC signal injected in the center tap of main field winding.

During start mode the WFSM with field injected AC signal operates as a synchro at the injected frequency. The 3-wire synchro output can be easily converted into the resolver-equivalent format using Clark's 3-phase to 2-phase transformation (ABC to $\alpha\beta$ stationary reference frames). The AC signal that contains rotor position information can be selected using synchronous filter which is synchronized with the quadrature generator that is used to inject the AC signal into the field winding, as indicated in FIG. 5.

The HFRT can also play a useful role in a generate mode by providing alternative current path during overvoltage conditions. In this mode the primary winding of the HFRT is connected to the passive damper (resistor) or active damper such as a voltage control resistor (FET). A single phase inverter can be also utilized to inject a pulse into main field winding in coordination with the generator voltage regulator.

During engine start the synchronous exciter is configured as a three-phase Low Frequency Rotating Transformer (LFRT) to pass excitation power at zero and low rotor peed rotor to the main field winding. LFRT can operate at 400-1000 Hz during engine start mode. During generate mode the exciter is configured as a single phase exciter field winding operating at DC current.

A high level block diagram of electric engine start controller is shown in FIG. 4 and includes a speed control function using field-oriented controller (FOC) to control motor torque in response to the estimated rotor position. FIG. 5 illustrates an embodiment using resolver-based signal processing to estimate rotor position from zero to high generator speed. Another embodiment that utilizes zero/low speed position estimator and high speed position estimator based extended rotor flux is shown in FIG. 6.

The methods and systems described herein offer potential benefits including improved system performance and reliability when operating as an active rectifier due to improved position sensing accuracy. Additional potential benefits include improved system complexity and cost, potential damping of rotor oscillations at variable load and improved stability, improved power density when a smaller size machine is used for electric pumps or actuators, and potential reduction in size of power semiconductors when used as electric engine start due to improved accuracy in rotor position sensing. The transient response during overvoltage events may also be improved by providing a transient alternative path to the main field current. Further improvement in the generator dynamic performance may be facilitated by controlling voltage across the main field winding using a high frequency rotating transformer.

While shown and described in the exemplary context of a starter/DC power generating system, those skilled in the art will readily appreciate that such applications are exemplary only, ant that any other suitable applications can be used without departing from the scope of this disclosure.

The methods and systems described above and shown in the drawings, provide for electrical machine systems and methods with superior properties including, for example, improved system reliability, complexity, and cost without necessarily reducing power density. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. An electrical machine comprising:
   a stator including a main armature winding, an exciter field winding, and a transformer primary winding;
   a rotor operatively connected to rotate relative to the stator, wherein the rotor includes an exciter armature winding operatively connected to the exciter armature winding for field excitation therebetween, a main field winding operatively connected to the main armature winding for field excitation therebetween, and a transformer secondary winding operatively connected to the transformer primary winding to form a rotating transformer; and
   a generator control unit operatively connected to the main armature winding, exciter field winding, and transformer primary winding to control the main armature and exciter field windings based on excitation in the transformer primary winding received from the transformer secondary winding.

2. An electrical machine as recited in claim 1, further comprising an AC power source operatively connected between the generator control unit and the transformer primary winding to control power to the rotating transformer.

3. An electrical machine as recited in claim 1, further comprising a damper connected in parallel with the transformer primary winding.

4. An electrical machine as recited in claim 1, wherein the generator control unit is configured to direct external power through the stator to drive the rotor in a motoring mode and to deliver power from the stator to an external load in a generate mode.

5. An electrical machine as recited in claim 4, wherein the generator control unit includes an electric engine start controller having:
   a position and velocity decoder configured and adapted to receive inverter voltage signals and to output position and velocity feedback;
   a proportional and integral regulator with a first switch for switching between a velocity reference input for the motoring mode and a DC voltage reference for a generate mode, and a second switch for switching between the velocity feedback and a DC voltage feedback input, wherein the proportional and integral regulator is configured to output a quadrature current reference signal and a direct current reference signal in both the motoring and generate modes; and
   a field oriented control operatively connected to receive the reference signals from the proportional and integral regulator, the position feedback from the position and velocity decoder, and inverter current signals and to output stationary reference frame command signals.

6. An electrical machine as recited in claim 5, further comprising a quadrature generator operatively connected to an AC power source to inject a sine signal into the rotating transformer.

7. An electrical machine as recited in claim 5, wherein the position and velocity decoder includes a Clark's Transformation component operatively connected to convert three phase inverter voltage signals into two phase voltage signals, with a pair of synchronous filters each operatively connected to receive a respective one of the two phase voltage signals, each synchronous filter being operatively connected to receive sine and cosine signals from a quadrature generator and to output first and second filtered two phase voltage signals phase-shifted by 90 electrical degrees that include rotor position information.

8. An electrical machine as recited in claim 7, further comprising a position/velocity estimator operatively connected to receive first and second filtered two phase voltage signals from the synchronous filters and to output the position feedback and the velocity feedback.

9. An electrical machine as recited in claim 7, further comprising:
    a second Clark's Transformation component operatively connected to convert three phase inverter current signals into two phase current signals; and
    an extended rotor flux estimator operatively connected to receive the two phase current signals and the two phase voltage signals and to output first and second extended flux voltage signals phase-shifted by 90 electrical degrees that include extended rotor flux information.

10. An electrical machine as recited in claim 9, further comprising a position/velocity estimator with a first switch for switching between the first extended flux voltage signal input in a high speed mode and the first filtered two phase voltage signal input in a low speed mode and a second switch for switching between the second extended flux voltage signal input in a high speed mode and the second filtered two phase voltage signal in a low speed mode, wherein the position/velocity estimator is configured to output the position feedback and the velocity feedback.

11. An electrical machine as recited in claim 10, further comprising an estimated mode selector operatively connected to receive the velocity feedback and control the first and second switches of the position/velocity estimator for selection between the high and low speed modes.

12. A method of controlling an electrical machine comprising:
    receiving an excitation signal with a primary transformer winding of an electrical machine as recited in claim 1; and
    estimating position and velocity of the rotor based on the excitation signal; and
    using estimated position and velocity of the rotor to control the electrical machine.

13. A method as recited in claim 12, wherein using estimated position and velocity of the rotor to control the electrical machine includes controlling rotor torque in a motoring mode and controlling output voltage in a generate mode.

14. A generator control unit for controlling a main armature and exciter field winding of a stator to drive a rotor in a motoring mode and to deliver power from the stator to an external load in a generate mode, the generator control unit comprising:

a position and velocity decoder configured and adapted to receive inverter voltage signals and to output position and velocity feedback;
a proportional and integral regulator with a first switch for switching between a velocity reference input for the motoring mode and a DC voltage reference for a generate mode, and a second switch for switching between the velocity feedback and a DC voltage feedback input, wherein the proportional and integral regulator is configured to output a quadrature current reference signal and a direct current reference signal in both the motoring and generate modes; and
a field oriented control operatively connected to receive the reference signals from the proportional and integral regulator, the position feedback from the position and velocity decoder, and inverter current signals and to output stationary reference frame command signals.

15. A generator control unit as recited in claim 14, further comprising a quadrature generator operatively connected to an AC power source to inject a sine quadrature signal into an excitation coil.

16. A generator control unit as recited in claim 14, wherein the position and velocity decoder includes a Clark's Transformation component operatively connected to convert three phase inverter voltage signals into two phase voltage signals, with a pair of synchronous filters each operatively connected to receive a respective one of the two phase voltage signals, each synchronous filter being operatively connected to receive sine and cosine signals from a quadrature generator and to output first and second filtered two phase voltage signals phase-shifted by 90 electrical degrees that include rotor position information.

17. A generator control unit as recited in claim 16, further comprising a position/velocity estimator operatively connected to receive the first and second filtered two phase voltage signals from the synchronous filters and to output the position feedback and the velocity feedback.

18. A generator control unit as recited in claim 16, further comprising:
    a second Clark's Transformation component operatively connected to convert three phase inverter current signals into two phase current signals; and
    an extended rotor flux estimator operatively connected to receive the two phase current signals and the two phase voltage signals and to output first and second extended flux voltage signals phase-shifted by 90 electrical degrees that include extended rotor flux information.

19. A generator control unit as recited in claim 18, further comprising a position/velocity estimator with a first switch for switching between the first extended flux voltage signal input in a high speed mode and the first filtered two phase voltage signal input in a low speed mode and a second switch for switching between the second extended flux voltage signal input in a high speed mode and the second filtered two phase voltage signal in a low speed mode, wherein the position/velocity estimator is configured to output the position feedback and the velocity feedback.

20. A generator control unit as recited in claim 19, further comprising an estimated mode selector operatively connected to receive the velocity feedback and control the first and second switches of the position velocity/estimator for selection between the high and low speed modes.

* * * * *